United States Patent [19]

Murakawa et al.

[11] Patent Number: 4,923,652
[45] Date of Patent: May 8, 1990

[54] METHOD OF REMOVING BINDER FROM POWDER MOLDED PRODUCTS

[75] Inventors: Norihiro Murakawa; Hisashi Isomura; Kazukiyo Miura, all of Shimonoseki; Shinichi Aoki, Yokohama, all of Japan

[73] Assignee: Mitsui Toatsu Chemicals, Inc., Japan

[21] Appl. No.: 186,487

[22] PCT Filed: Jul. 1, 1987

[86] PCT No.: PCT/JP87/00459
§ 371 Date: Feb. 24, 1988
§ 102(e) Date: Feb. 24, 1988

[87] PCT Pub. No.: WO88/00174
PCT Pub. Date: Jan. 14, 1988

[30] Foreign Application Priority Data

Jul. 1, 1986 [JP] Japan .................... 61-152807
Feb. 26, 1987 [JP] Japan .................... 62-41487

[51] Int. Cl.$^5$ .................................. C04B 33/34
[52] U.S. Cl. ........................... 264/62; 264/63; 264/344
[58] Field of Search ............................ 264/62, 63, 344

[56] References Cited

U.S. PATENT DOCUMENTS 4,248,813 2/1981 Hottori et al. ............... 264/62
4,612,146 9/1986 Huther ........................ 264/62
4,647,414 3/1987 Mizuno ........................ 264/62
4,696,777 9/1987 Ito ............................ 264/62

FOREIGN PATENT DOCUMENTS 59-198105 11/1984 Japan .

OTHER PUBLICATIONS

Partial Translation of Japanese Patent 59198105.

*Primary Examiner*—James Derrington
*Attorney, Agent, or Firm*—Scully, Scott, Murphy & Presser

[57] ABSTRACT

A method of vaporizing and removing a binder from a powder-molded product containing the binder, which method comprises:
  coating the greater part of the surface of said powder-molded product with a thin resin film having airtightness thereby leasing an exposed surface portion;
  pressurizing the thus-coated surface portion of the pressure-molded product hydrostatically;
  vaporizing the binder in the power-molded product under said hydrostatic pressurization; and
  removing the vaporized binder to the exterior of the power-molded product through said exposed surface portion not coated with the thin film.

9 Claims, 1 Drawing Sheet

METHOD OF REMOVING BINDER FROM POWDER MOLDED PRODUCTS

FIELD OF ART

The present invention relates to a method of removing a binder from powder molded products and more particularly to a method of removing a binder used as a molding assistant from powder molded products produced according to injection molding or slip casting to obtain sintered ceramic products, thus relating to a so-called powder molded products dewaxing method.

BACKGROUND ART

Sintered ceramic products as mass-produced products complicated in shape are industrially produced by molding such powders as alumina, zirconia, silicon carbide and silicon nitride as raw materials into desired shapes according to injection molding or slip casting, followed by dewaxing, and then igniting the thus-obtained powder molded products at a temperature required for sintering.

The injection molding referred to above is a molding method in which a binder exhibiting plasticity as a whole and making molding easier such as, for example, polystyrene, polyethylene, diethylene phthalate, paraffin, fatty acid ester, or polyvinyl alcohol, is added to and kneaded with, for example, alumina powder as mentioned above in an amount of 20 to 35 parts by weight based on 100 parts by weight of the powder, and the kneaded mixture is charged under pressure into a desired shape of a mold and molded. The resulting powder-molded product is taken out of the mold and the binder is vaporized and removed by heating, followed by igniting to obtain a sintered ceramic product of a desired shape.

The slip casting referred to above is a casting method in which 20 to 40 parts by weight of a binder which is water or a mixture of water with an alcohol, as well as a small amount of a peptizer such as HCl, AlCl$_3$, NaOH or water glass, are added to and thoroughly mixed with 100 parts by weight of, for example, alumina powder as mentioned above to obtain a stable slip having fluidity and difficult for the powder to precipitate, then this slip is poured into a mold of a porous material such as gypsum, allowing at least the binder contained in the slip to be absorbed into the mold until the slip has no longer fluidity, and then the resulting powder-molded product is taken out from the mold. The powder-molded product thus obtained still contains the binder, e.g. water, usually in an amount of 10% to 15% by weight. Therefore, as in the case of injection molding, such remaining binder is vaporized and removed by heating, followed by igniting to a temperature of, say, 1,300°–2,300° C., whereby a sintered ceramic product can be obtained.

A thermoplasticizer, a plasticizer, a dispersant and a solvent added to a powder in the injection molding and slip casting in the present invention will hereinafter be named generically as "binder". And the operation for vaporizing and removing, by heating or any other suitable means, the binder remaining in a molded product obtained according to the foregoing injection molding or slip casting, will hereinafter be referred to as "dewaxing" which term is commonly used by those skilled in art.

However, sintered ceramic products resulting from dewaxing and subsequent igniting of powder molded products obtained by the foregoing method, i.e., injection molding or slip casting, involve the problem that they are often defective (incapable of being used as products) due to cracking or delamination.

Further, once such defects occur in the interior of the sintered ceramic products, it is difficult to find out the defects at the stage of commercialization, so parts of such defective products are commercialized as they are, thus causing breakage in use. This is a serious problem.

In this connection, it is to be specially noted that such defects as cracking and delamination occur in the dewaxing step in most cases.

More particularly, if a binder remains in a powder-molded product, the remaining binder will vaporize rapidly when igniting the powder-molded product into a sintered ceramic product, thus causing fracture or cracking in the same product. To prevent this, that is, to remove the binder, the powder-molded product is subjected to dewaxing before the ignition. Inevitably, therefore, it is desirable to remove the binder as completely as possible in the dewaxing step.

As previously noted, however, powder molded products contain not less than 10 wt. % of a binder even in the case of slip casting and a larger amount, not less than 20 wt. %, of a binder in the case of injection molding. It is essentially extremely difficult to vaporize and remove the binder by heating from the powder molded products containing the binder in such a large amount without causing fracture or cracking because a large expansion force of the binder induced by the heat vaporization is exerted strongly on the powder molded products whose mechanical strength is very low.

Therefore, this process has heretofore been carried out by heating the powder molded products to a temperature of 600° C. or so at the highest at atmospheric pressure or under a pressure of 5 kg/cm$^2$ or lower to remove the binder through evaporation, efflux or combustion. In order to keep low the expansion force of the binder, there is adopted an extremely low heat-up rate for the powder molded product which ranges from 1° to 3° C./h. The dewaxing step usually requires a long period of 5 to 7 days because it cannot help adopting such low heat-up rate, thus impeding the productivity markedly.

In injection molding, moreover, a large amount of the binder used would result in increased volume of voids formed after removal of the binder in the dewaxing step. Therefore, it is required that the amount of the binder used be as small as possible and that the binder be easily molded and have properties capable of being easily heat-vaporized. However, there has been the problem that it is essentially extremely difficult to satisfy all of the above requirements even in the use of such expensive materials as the foregoing polystyrene and polyethylene.

Further since the powder molded products after dewaxing are almost zero in mechanical strength, fracture or cracking is apt to occur in the course of transfer to the next sintering step. In order to avoid this, it has been necessary to minimize vibration and deflection.

Thus, although the productivity is extremely low and the production is performed through extremely careful operations, not a few sintered ceramic products obtained are defective. This has mainly been attributable to the defects of powder molded products occurring in the dewaxing step.

Having made extensive studies for thoroughly eliminating the drawbacks of the prior art, the present inventors found out a method capable of suppressing the occurrence of such defects as fracture and cracking to a remarkable extent as compared with that in the prior art even when the binder was removed in an extremely short time. In this way the present invention was completed.

DISCLOSURE OF THE INVENTION

Figure 1:
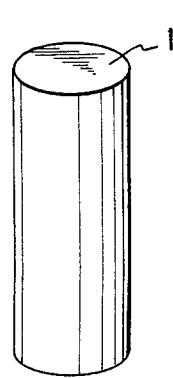
FIGS. 1 and 2 are perspective views showing examples of shapes of powder molded products used in the present invention.

According to the present invention there is provided a method of vaporizing and removing a binder from a powder-molded product containing the binder, which method comprises coating the greater part of the surface of said powder-molded product with a thin resin film having air-tightness thereby leaving an exposed surface portion, pressurizing the coated surface of the molded product hydrostatically, allowing the binder contained in the molded product to vaporize under the hydrostatic pressure, and allowing the vaporized binder to escape to the exterior of the molded product through said exposed surface portion.

In the present invention, in dewaxing a powder-molded product obtained by, for example, injection molding or slip casting and still containing a binder, the surface of the powder-molded product exposed is coated with a thin resin film having airtightness while remaining a part of the surface uncoated.

Such thin film can be formed on the surface by, for example, applying a liquid resin which solidifies upon evaporation of a solvent or a chemical reaction thinly onto the surface of the molded product directly or by spraying or by dipping and pulling up, followed by drying or heating as necessary. Preferably, the resin used for this purpose can afford a thin film having air-tightness, namely, gas impermeability and also having elasticity and/or flexibility so that a hydrostatically pressurizing action can be exerted effectively on the molded product. As examples of the said resin are mentioned such industrially manufactured resins as epoxy, resins, acrylic resins, polyester resins, chloroprene resins, polyurethane resins, silicone resins, vinyl acetate resins, styrene-butadiene rubber, acrylic rubbers, natural rubbers, and phenolic resins. The liquid resin may take a suitable form according to the kind of resin used; for example, it may be in the form of latex, emulsion or solution. Moreover, among the acrylic, epoxy and polyester resins there are included those which when applied in a powdery state and heated are fused to form a coating. Such resins are also employable.

The thickness of the thin film may be decided suitably in view of the shape of the powder-molded product, particle size of the powder, pressure in the hydrostatic pressurization, and the kind of the thin film, provided it should be not smaller than the minimum thickness required for maintaining airtightness.

According to experimental knowledge of the present inventors, it is desirable that the thickness of the thin film be usually not smaller than 10 $\mu$m. There is no special upper limit of the thin film thickness, but for convenience' sake in handling, it is desirable that the thin film thickness be up to 5 mm or so. Of course, even larger values are employable depending on the kind of the thin film.

The thin film constituting resin preferably has a certain degree of elasticity (including flexibility) as previously noted. This is because the thin film formed of the resin exhibits the function that hydrostatic pressure is transmitted effectively to the molded product through the thin film which is in close contact with the surface of the molded product and the voids formed in the molded product as a result of vaporization of the binder are eliminated effectively by isotropic contraction caused by the hydrostatic pressurization. The degree of elasticity of the resin is not specially limited as long as the thin film exhibits such function effectively. For example, as a measure of selection, the glass transition point of the thin film is not higher than the dewaxing temperature.

Figure 2:
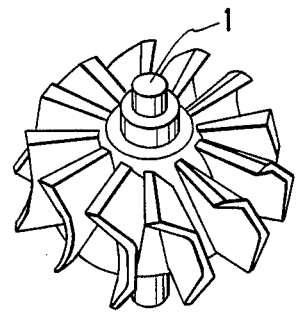

In the present invention it is necessary that a part of the surface of the powder-molded product be exposed without coating, thereby allowing the vaporized binder to escape from the thus-exposed surface portion. The position of the exposed surface portion should be decided in consideration of the shape of the powder-molded product and a partial mechanical load applied to a sintered ceramic product obtained from the powder-molded product. For example, if the shape of the powder-molded product is symmetric with respect to an axial, it is preferable that the exposed surface portion be located at an axial end because of easiness of the pressurizing operation. Further, it is preferable that if the powder-molded product is in the form of a cylinder, the exposed surface portion be one end section, as shown in FIG. 1 and that if it is in the shape of a propeller, the exposed surface portion be one end section of the rotating shaft. The reason is that in the vicinity of the exposed surface portion the powder is difficult to be pressurized uniformly, so the mechanical load is not large in the form of a sintered ceramic product. Such exposed surface area portion as shown in FIGS. 1 and 2 satisfies the conditions mentioned above.

From the exposed surface portion there escapes the vaporized binder, so if the area of this surface is too small, a longer time will be required for dewaxing, while a too large area of this surface would result in increase in the proportion of the portion of the powder-molded product which portion is difficult to be compressed uniformly. An appropriate area of the exposed surface portion is decided in consideration of the above tendency as well as the size and shape of the powder-molded product. According to the present inventors' knowledge obtained through experiments, the exposed area is in the range of 0.5 to 20%, preferably 1 to 10%, of the total surface area. Usually, one such exposed surface portion may be provided, but a plurality of such exposed surface portions may be provided depending on the shape of the powder-molded product, etc.

In this way a portion of the powder-molded product is exposed and the remaining portion is coated with the thin film. The thus-coated surface portion is first subjected to hydrostatic pressurization.

The hydrostatic pressurization may be carried out by dipping the coated surface in liquid and pressurizing the liquid with a pump or the like. A suitable example of the liquid used for this purpose is about 30 wt. % of aqueous boric acid or hydraulic oil. The pressure to be applied to the liquid should be decided so that the expansion force induced upon heating of the binder does not cause defects such as cracking in the powder-molded product. It is suitably selected according to the kind of binder, heating temperature and the shape of powder-molded product. For attaining the purpose in question, the said pressure is preferably not lower than 5 kg/cm$^2$.

Further, it is preferable that the hydrostatic pressure be set at a level at which the voids formed by vaporization of the binder can be eliminated by isotropic contraction of the powder-molded product upon hydrostatic pressurization. In view of this point it is desirable that the hydrostatic pressure be in the range of 500 kg/cm$^2$ or more to 10 tons/cm$^2$ or less.

Figure 3:
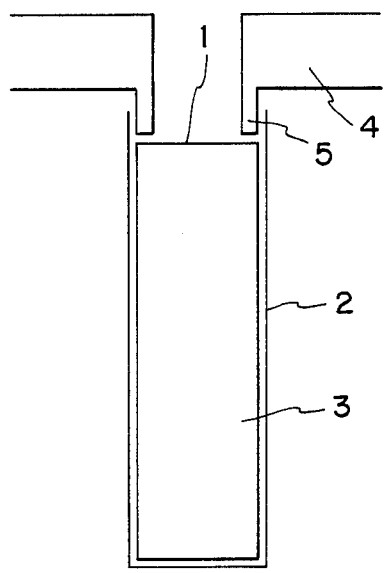
FIGS. 3 and 4 are sectional views of powder molded products used in the present invention as attached to a pressure vessel.

For pressurizing only the coated surface, there may be adopted, for example, such a method as illustrated in FIG. 3. As shown therein, a powder-molded product 3 and a hollow pressure-resisting pipe 5 are interconnected and in this state the surface of the powder-molded product and the outer surface of the pressure-resisting pipe are coated with the same thin film. As a result, the surface of the powder-molded product in contact with the interior of the hollow pressure-resisting pipe is an exposed surface not coated with the thin film. In this state the coated surface may be pressurized.

Figure 4:
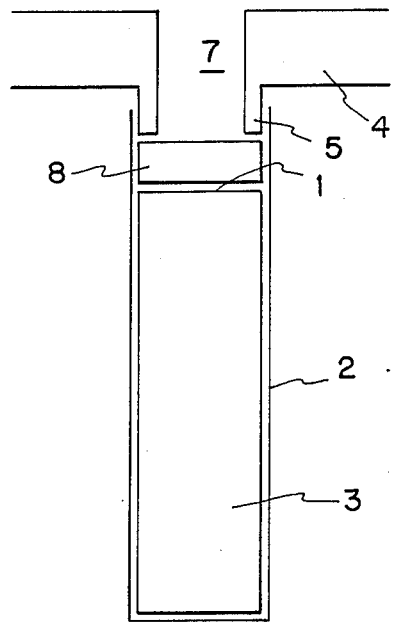

It is preferable that the exposed surface be compressed by a suitable method so as not to induce distortion in the vicinity thereof. For example, it is effective to bring a gas permeable porous pipe into contact with the exposed surface within the hollow pressure-resisting pipe, as shown in FIG. 4. The porous pipe has a pore diameter not larger than 5 mm, preferably not larger than 1 mm, more preferably not larger than 0.1 mm and not smaller than 0.01 $\mu$m.

In such a hydrostatically pressurized state of the coated surface of the powder-molded product, the binder contained therein is vaporized. The vaporization is effected by heating the powder-molded product from the exterior to vaporize or decompose the binder and/or by vacuum suction for the powder-molded product through the exposed surface.

The thus-vaporized binder is allowed to escape and removed to the exterior through the exposed surface portion of the molded product not coated with the thin film.

The heating for the powder-molded product to vaporize the binder as a molding aid is done through pressurized liquid such as pressurized aqueous boric acid or hydraulic oil. Heat-up rate, ultimate temperature and holding time are suitably selected according to the kind of binder.

Reference will now be made to a preferred mode of vaporizing and removing the binder by heating. In the range from room temperature up to a temperature lower by about 15° C. than the boiling point of a volatile component contained in the binder, the heating may be done at any desired rate, but once such temperature is reached, the powder-molded product is held in the temperature range of from such temperature to a temperature lower by about 2° C. than the boiling point of the volatile component, for 3 to 10 hours, allowing approximately 40-60% of the volatile component to be vaporized and removed during that period. Then, heating is made to a temperature not lower than the boiling point of the volatile component to vaporize and remove the remaining volatile component. The dewaxing operation is now completed.

In heating the powder-molded product in the above manner, suction ma be made through the exposed surface portion by means of a blower. This is also a preferred made for vaporizing the volatile component rapidly.

Further, the mode of vaporizing and removing the binder by vacuum suction-deaeration through the exposed surface portion can be effected by maintaining a spatial portion 7 which is in contact with the exposed surface portion as shown in FIG. 3 at a reduced pressure by means of a vacuum generator (not shown) such as a vacuum pump or an ejector.

In this way the binder is subjected to vacuum suction-deaeration and allowed to escape to the exterior through the exposed surface portion, and thus the powder-molded product is dewaxed easily. The degree of the vacuum reduction can be varied also according to the kind of the binder to be dewaxed. But, usually it is not higher than 700, preferably 500, more preferably 100 and still more preferably 10, mmHg abs., and not lower than 10$^{-5}$ mmHg abs. In performing the vacuum suction-deaeration, it is more desirable that not only the spatial portion in contact with the exposed surface portion but also the interior of the powder-molded product be held at a reduced pressure using a vacuum generator of a large capacity.

In the case of removing the binder by vacuum suction-deaeration, it is not always necessary to heat the powder-molded product in the dewaxing step. But when heating is made, there may be adopted a temperature much lower than that in the conventional process. That is, the degree of pressure reduction and the temperature should be suitably selected in consideration of the boiling point (or vapor pressure-temperature curve) of the material to be dewaxed. It goes without saying that the higher the degree of pressure reduction, the lower can be the (heating) temperature of the powder-molded product. Even room temperature may be adopted in some case.

And as previously noted, the heating is effected through pressurized aqueous boric acid or hydraulic oil.

The present invention has the following advantageous effects. According to the method of the present invention, a binder contained in a powder-molded product is vaporized and removed while pressurizing the powder-molded product hydrostatically, so even when voids are formed in the interior of the molded product, such voids can be eliminated easily by isotropic contraction of the molded product induced by the hydrostatic pressurization. Consequently, where injection molding is adopted in the present invention, it is not always necessary to use as the binder such expensive material as has heretofore been used, e.g. polystyrene or polyethylene. There may be used even a viscous 0.1-5% solution of a water-soluble high polymer such as polyvinyl alcohol, carboxymethyl cellulose or polyethylene glycol in water, or a 1-20% solution of an oil such as lauric acid, palmitic acid, stearic acid or glycerin in alcohol. These solution are inexpensive.

Where slip casting is adopted in the present invention, there is used the same binder as in the prior art such as, for example, a binder comprising water or a mixture of water and an alcohol and a small amount of a peptizer such as HCl, AlCl$_3$, NaOH or water glass.

Since the above materials lower in boiling point than those used heretofore are also employable as binder in the present invention, the heating in the dewaxing step can be done at a lower temperature.

INDUSTRIAL UTILIZABILITY

In the method of the present invention, a part of the surface of the powder-molded product is exposed, while the remaining surface portion is coated with a thin film having both airtightness and elasticity, then the binder contained therein is vaporized and removed through the above exposed surface portion under application of a hydrostatic pressure of, say, 500 kg/cm$^2$ or higher. According to the present invention, therefore, the expansion force induced by the vaporization of the binder can be suppressed effectively by the said hydrostatic pressure. Consequently, the dewaxing operation can be carried out in an extremely short time and the occurrence of defects such as fracture and cracking caused by the dewaxing can be suppressed to a greater extent than in the prior art.

The dewaxing operation in the present invention is performed in the above manner, so when the volume of the powder-molded product is, say, 1 l or so, the dewaxing operation can be completed within 24 hours, far shorter than in the prior art.

Moreover, since the voids formed in the interior of the powder-molded product after the removal of the binder can be eliminated easily by isotropic contraction of the molded product, it is not always required to use the expensive polystyrene which has been developed as a binder easily exhibiting plasticity when kneaded with powder even in a small amount and capable of being vaporized and removed easily by heating.

Further, since the thin film coated over the powder-molded product also serves to reinforce the same product, it is possible to prevent fracture and cracking which may occur in the course of transfer to the sintering step of the powder-molded product after dewaxing.

Additionally, since lower boiling materials than polystyrene and polyethylene are employable as binders in the present invention, it is not necessary to perform the dewaxing operation at such a high temperature as 600° C. or so which is required in the use of polystyrene or polyethylene. Some such materials permit execution of the dewaxing operation at a far lower temperature, for example, at a temperature in the range of room temperature to 250° C. Thus, the present invention is extremely advantageous also in point of heat energy consumed.

Since the present invention has such advantageous effects, it can be effectively applied particularly to the production of sintered ceramic products which are relatively complicated in shape requiring injection molding or slip casting and which are required to have reliability in mechanical strength.

EXAMPLE 1

As starting powders there were used 100 parts by weight of silicon nitride powder having a specific surface area of 15 m$^2$/g and an average particle diameter of 0.3 $\mu$ as measured using an electron microscope image and 5 parts by weight of magnesium oxide having a specific surface area of 12 m$^2$/g and an average particle diameter of 0.35 $\mu$ as measured using an electron microscope image. 25 parts by weight of ethanol and 5 parts by weight of lauric acid were added as a binder to the starting powders, followed by kneading. The resultant mixture was subjected to injection molding at an injection pressure of 500 kg/cm$^2$ to obtain a cylindrical, 15 mm dia. by 50 mm long, powder-molded product containing silicon nitride. The proportion by volume (hereinafter referred to as "percent powder packing") of the starting powders relative to the apparent volume of the powder-molded product obtained was 57%.

As shown in FIG. 4, a porous body 8 (diameter: 15 mm, length: 10 mm, average pore diameter: 10 $\mu$) made of alumina was put on one end portion of the powder-molded product indicated by the numeral 3 and connected to a hollow pressure-resisting pipe 5 fixed to a pressure-resisting vessel. In this state the surfaces of the molded product, porous body and pipe were coated with a thin film 2 having a thickness of 120 $\mu$m. The percent area of the exposed surface portion was 6%. The coating was performed by applying a liquid styrene-butadiene latex (a copolymer of 60% styrene and 40% butadiene) to the powder-molded product according to a dip-pulling up method and then drying off the water contained in the latex to form a thin film on the surface.

Next, the dewaxing step was carried out by filling the pressure-resisting vessel with 30 wt. % of aqueous boric acid and heating the aqueous boric acid with a heater in a pressurized state to 1500 kg/cm$^2$ using a pump to raise the temperature of the powder-molded product. The heating using the aqueous boric acid was done in the following manner.

The temperature of the powder-molded product was raised from room temperature up to 75° C. at a rate of 30° C./h, and after holding at 75° C. for 3 hours, the temperature was raised from 75° C. to 174° C. at a rate of 30° C./h, and after holding at 174° C. for 2 hours, the temperature was raised to 210° C. at a rate of 30° C./h, and after holding at 210° C. for 1 hour, the molded product was allowed to cool down to room temperature. The total time from the start of heating to the cooling to room temperature was 19 hours. During this period the aqueous boric acid was held in a pressurized state of 1500 kg/cm$^2$.

The ethanol and lauric acid contained in powder-molded product were vaporized and removed from the exposed surface portion no coated with the thin film to the exterior of the pressure-resisting vessel through the porous body 8 made of alumina and the hollow pressure-resisting pipe 5. The pressure of the said exterior was atmospheric pressure.

The powder-molded product 3 taken out from the pressure-resisting vessel was free from any such change in appearance as cracking or breakage of the thin film. The ethanol and lauric acid were vaporized and removed not less than 99%. The percent powder packing was 62%, showing an increase as compared with that before dewaxing.

The powder-molded product was then heated at 1,800° C. for 2 hours in a nitrogen gas atmosphere of 5 kg/cm$^2$ to obtain a sintered ceramic product. The density of the sintered product was 3.14 g/cm$^3$, corresponding to 99% of the theoretical density of silicon nitride.

Twenty test pieces were cut out from the sintered ceramic product and measured for bending strength in accordance with JIS R-1601. As a result, an average strength and a standard deviation were 82 kg/mm$^2$ and 3.1 kg/mm$^2$, respectively.

COMPARATIVE EXAMPLE 1

A cylindrical powder-molded product containing silicon nitride, prepared by injection molding in just the same way as in Example 1 was heat-dewaxed according to just the same heating method as in Example 1, in air of atmospheric pressure, directly without thin coating.

In the powder-molded product after dewaxing were found a number of cracks at intervals of 2 to 4 mm, and exfoliations 1 to 2 mm thick were observed over approximately 40% of the surface.

COMPARATIVE EXAMPLE 2

The same silicon nitride powder and magnesium oxide as in Example 1 were used in amounts of 100 and 5 parts by weight, respectively, as starting powders, to which were added polypropylene, polyethylene and stearic acid in amounts of 19, 10 and 1 parts by weight, respectively, followed by kneading. The mixture thus obtained was subjected to injection molding in just the same manner as in Example 1 to obtain a powder-molded product having a percent powder packing of 59%.

The powder-molded product was then dewaxed by the following conventional heating method. The temperature of the powder-molded product was raised from room temperature up to 100° C. at a rate of 30° C./h, then from 100° C. to 600° C. at a rate of 2° C./h, and after holding at 600° C. for 2 hours, the molded product was allowed to cool down to room temperature. A nitrogen gas atmosphere was adopted except in the stage of holding at 600° C. for 2 hours in which stage was adopted an air atmosphere for oxidative destruction of the binder. And the pressure was atmospheric pressure. The total time from the start of heating to the cooling to room temperature was 260 hours. In the powder-molded product taken out from the vessel was found no such change in appearance as cracking or delamination. Not less than 99.5% of the binder, including polypropylene, was vaporized and removed. The percent powder packing was the same as that before dewaxing, i.e. 59%.

The powder-molded product was then heated at 1,800° C. for 2 hours in just the same manner as in Example 1 to afford a sintered product having a density of 3.11 g/cm$^3$.

Test pieces were cut out from the sintered product and measured for bending strength in just the same manner as in Example 1. As a result, an average strength and a standard deviation were 68 kg/mm$^2$ and 6.6 kg/mm$^2$, respectively.

A comparison between Example 1 and Comparative Example 1 shows that it is extremely effective for the prevention of cracking and delamination to coat the powder-molded product with a thin film, pressurize the coated surface hydrostatically and dewax the molded product in this pressurized condition.

From a comparison between Example 1 and Comparative Example 2 relating to a conventional dewaxing method it is seen that the percent powder packing of the powder-molded product after dewaxing according to the present invention is higher than that of the prior art and that the bending strength of the sintered product obtained according to the present invention is large and variations thereof are much smaller.

EXAMPLES 2-4

The same silicon nitride powder and magnesium oxide powder as in Example 1 were used as starting powders in amounts of 100 and 5 parts by weight, respectively. To the starting powders were added the binders shown in Table 1 in the respective amounts (part by weight) described in the same table, followed by kneading. The mixtures thus obtained were subjected to injection molding in just the same way as in Example 1 to afford powder-molded products containing silicon nitride and having the values of percent powder packing shown in Table 1.

Then, in the same manner as in Example 1 the powder-molded products thus obtained were each connected to a hollow pressure-resisting pipe through a porous body made of alumina as shown in FIG. 4 and in this state the surfaces of the molded product, porous body and pipe were coated with a thin film. The coating was effected by the application of an acrylic emulsion and subsequent removal of water by drying in Example 2, and by the application of chloroprene resin in ethyl acetate as solvent and subsequent removal of the solvent by drying in Examples 3 and 4. The thin films were 120 μm thick in Example 2 and 230 μm in Examples 3 and 4.

The thus-coated surfaces of the powder-molded products were then raised in its temperature and dewaxed by heating 30 wt. % aqueous boric acid with a heater under the application of a hydrostatic pressure of 1,500 kg/cm$^2$ in the same manner as in Example 1.

In Example 2 the heating was done in just the same way as in Example 1, while in Examples 3 and 4 the heating was effected in the following manner. The temperature of each powder-molded product was raised from room temperature to 98° C. at a rate of 30° C./h, and after holding at 98° C. for 5 hours, from 98° C. to 110° C. at a rate of 10° C./h, and after holding at 110° C. for 2 hours, the molded products were allowed to cool down to room temperature. The total time from the start of the heating to the cooling to room temperature was 15 hours.

In the powder-molded products taken out from the pressure-resisting vessel there was found no such change in appearance as cracking or breakage of the thin film. In all of them, not less than 99% of each binder was vaporized and removed. The values of percent powder packing were all larger than those before dewaxing, as shown in Table 1.

Then, the powder-molded products were heated at 1,800° C. for 2 hours in just the same way as in Example 1 to obtain sintered products having the densities described in Table 1.

Test pieces were cut out from those sintered products in just the same manner as in Example 1 and measured for bending strength. Average values and standard deviations are as shown in Table 1.

TABLE 1

| Example | | 2 | 3 | 4 |
|---|---|---|---|---|
| Binder | Kind | EtOH | Water | Water |
| | Part by weight | 25 | 30 | 35 |
| | Kind | Lauric Acid | PVA* | CMC** |
| | Part by weight | 5 | 0.5 | 0.5 |
| Percent Powder Packing (before dewaxing) % | | 57 | 58 | 56 |
| Percent Powder Packing (after dewaxing) % | | 62 | 62 | 61 |
| Density of Sintered Product g/cm$^3$ | | 3.14 | 3.15 | 3.13 |
| Bending Strength | Average Value kg/mm$^2$ | 81 | 84 | 75 |
| | Standard Deviation kg/mm$^2$ | 3.6 | 2.5 | 3.9 |

*Polyvinyl alcohol
**Carboxymethyl cellulose

EXAMPLES 5-7

The following experiment was made for the purpose of confirming the effect of hydrostatic pressures. As starting powders there were used silicon carbide powder having a specific surface area of 17 m$^2$/g and an average particle diameter of 0.25 $\mu$ as measured using an electron microscope image, elemental boron having a specific surface area of 10 m$^2$/g and an average particle diameter of 0.4 $\mu$, and carbon black having a specific surface area of 90 m$^2$/g and an average particle diameter of 0.03 $\mu$, in amounts of 100, 1 and 2 parts by weight, respectively. To those starting powders were added as a binder 30 parts by weight of isopropanol and 3 parts by weight of myristic acid, followed by kneading. The resulting mixture was subjected to injection molding in just the same way as in Example 1. In this way there were obtained three powder-molded products each having a percent powder packing of 57%.

Then, in just the same manner as in Example 1 the powder-molded products thus obtained were each connected to the hollow pressure-resisting pipe 5 through the porous body 8 made of alumina and in this state the surfaces of the molded product, porous body and pipe were coated with styrene-butadiene latex, followed by drying to remove water to form a thin film of 120 $\mu$ thickness on those surfaces.

Then, heating was made in just the same manner as in Example 1 while maintaining the thus-coated surfaces of the powder-molded products in a hydrostatically pressurized state at the pressures shown in Table 2. In this way dewaxing was effected. The values of percent powder packing after the dewaxing are as described in the same table.

The thus-dewaxed powder-molded products were then heated at 2,050° C. in vacuum (not higher than 1 mmHg) for 1 hour to obtain sintered products containing silicon carbide. The densities of the sintered products are as shown in Table 2.

TABLE 2

| Example | | 5 | 6 | 7 |
|---|---|---|---|---|
| Hydrostatic Pressure kg/cm$^2$ · G | | 10 | 500 | 2000 |
| Percent Powder Packing (after dewaxing) % | | 57 | 59 | 62 |
| Density of Sintered Product g/cm$^3$ | | 3.08 | 3.14 | 3.17 |
| Bending Strength kg/mm$^2$ | Average Value | 51 | 69 | 75 |
| | Standard Deviation kg/mm$^2$ | 6.3 | 5.2 | 4.1 |

EXAMPLE 8

As starting powders there were used 100 parts by weight of silicon nitride powder having a specific surface area of 15 m$^2$/g and an average particle diameter of 0.3 $\mu$ as measured using an electron microscope image, 3 parts by weight of aluminum oxide having a specific surface area of 20 m$^2$/g, and 2 parts by weight of yttrium oxide having a specific surface area of 16 m$^2$/g. To the starting powders was added as a binder 35 parts by weight of water containing 0.2 wt. % of polyvinyl alcohol dissolved therein, followed by kneading. The resulting mixture was subjected to injection molding at an injection pressure of 500 kg/cm$^2$·G to obtain a cylindrical, 15 mm dia. by 50 mm long, powder-molded product containing silicon nitride. The percent powder packing of the powder-molded product obtained was 57%.

Then, as shown in FIG. 4, a porous body 8 (diameter: 15 mm, length: 10 mm, average pore diameter: 10 $\mu$) made of alumina was put on one end portion of the powder-molded product indicated by the numeral 3 and connected to a hollow pressure-resisting pipe 5 fixed to a pressure-resisting vessel. In this state the surfaces of the molded product, porous body and pipe were coated with a thin film 2 having a thickness of 120 $\mu$. The coating was performed by applying a liquid styrene-butadiene latex (a copolymer of 60% styrene and 40% butadiene) to the powder-molded product and then drying off the water contained in the latex to form a thin film on the surface.

The powder-molded product thus coated with the thin film was then subjected to dewaxing. The dewaxing step was carried out by filling the pressure-resisting vessel with 30 wt. % of aqueous boric acid, pressurizing the aqueous boric acid to 1,500 kg/cm$^2$·G by means of a pump, then reducing the pressure of the space 7 to 1~10 mmHg abs. and maintaining this state for 5 hours. The temperature of the aqueous boric acid was set at 60° C.

The powder-molded product 3 taken out from the pressure-resisting vessel was free from any such change in appearance as cracking or breakage of the thin film. Not less than 99% of the water used as a binder was vaporized and removed. The percent powder packing was 62%, showing an increase as compared with that before dewaxing.

The powder-molded product was then heated at 1,800° C. for 2 hours in a nitrogen gas atmosphere of 5 kg/cm$^2$·G to obtain a sintered ceramic product. The density of the sintered product was 3.14 g/cm$^3$, corresponding to 99% of the theoretical density of silicon nitride.

Twenty test pieces were cut out from the sintered product and measured for bending strength in accordance with JIS R-1601. As a result, an average strength and a standard deviation were 86 kg/mm$^2$ and 3.0 kg/mm$^2$, respectively.

COMPARATIVE EXAMPLE 3

A cylindrical powder-molded product containing silicon nitride, obtained by injection molding in just the same way as in Example 8, was reduced in pressure to 1~10 mmHg abs. directly without thin coating and in this state it was subjected to dewaxing in just the same manner as in Example 8. In the powder-molded product after dewaxing were found a number of cracks at intervals of 2 to 4 mm, and delaminations 1 to 2 mm thick were observed over approximately 50% of the surface.

COMPARATIVE EXAMPLE 4

The same silicon nitride powder, aluminum oxide and yttrium oxide as in Example 8 were used in amounts of 100, 3 and 2 parts by weight, respectively, as starting powders, to which were added polypropylene, polyethylene and stearic acid in amounts of 14, 10 and 1 parts by weight, respectively, followed by kneading. The mixture thus obtained was subjected to injection molding in just the same way as in Example 8 to obtain a powder-molded product having a percent powder packing of 59%.

The powder-molded product was then dewaxed by the following conventional heating method. The temperature of the powder-molded product was raised from room temperature to 100° C. at a rate of 30° C./h, then from 100° C. to 600° C. at a rate of 2° C./h, and after holding at 600° C. for 2 hours, the molded product was allowed to cool down to room temperature. A nitrogen gas atmosphere was adopted except in the stage of holding at 600° C. for 2 hours in which stage was adopted an air atmosphere for oxidative destruction of the binder. And the pressure was atmospheric pressure. The total time from the start of heating to the cooling to room temperature was 260 hours.

In the powder-molded product taken out from the vessel was found no such change in appearance as cracking or delamination. Not less than 99.5% of the binder, including polypropylene, was vaporized and removed. The present powder packing was the same as that before dewaxing, i.e. 59%.

The powder-molded product was then heated at 1,800° C. for 2 hours in just the same manner as in Example 8 to afford a sintered product having a density of 3.12 g/cm$^3$.

Test pieces were cut out from the sintered product and measured for bending strength. As a result, an average strength and a standard deviation were 74 kg/mm$^2$ and 5.9 kg/mm$^2$, respectively.

A comparison between Example 8 and Comparative Example 3 shows that it is extremely effective for the prevention of cracking and delamination to coat the powder-molded product with a thin film, pressurize the coated surface hydrostatically and dewax the molded product in a pressure-reduced condition of the exposed surface portion.

Further, from a comparison between Example 8 and Comparative Example 4 relating to a conventional dewaxing method it is seen that the percent powder packing of the powder-molded product after dewaxing according to the present invention is higher than that of the prior art and that the bending strength of the sintered product obtained according to the present invention is large and variations thereof are much smaller.

EXAMPLES 9-11

The same silicon nitride powder, aluminum oxide and yttrium oxide as in Example 8 were used as starting powders in amounts of 100, 3 and 2 parts by weight, respectively. To the starting powders were added the binders shown in Table 3 in the respective amounts (part by weight) described in the same table, followed by kneading. The mixtures thus obtained were subjected to injection molding in just the same way as in Example 8 to afford powder-molded products containing silicon nitride and having the values of percent powder packing shown in Table 3.

Then, in the same manner as in Example 8 the powder-molded products thus obtained were each connected to a hollow pressure-resisting pipe through a porous body made of alumina as shown in FIG. 4 and in this state the surfaces of the molded product, porous body and pipe were coated with a thin film. The coating was effected by the application of an acrylic emulsion and subsequent removal of water by drying in Example 9, and by the application of chloroprene resin in ethyl acetate as solvent and subsequent removal of the solvent by drying in Examples 10 and 11. The thin films were 140 $\mu$ thick in Example 9 and 210 $\mu$ in Examples 10 and 11.

Then, in the same way as in Example 8 the coated surfaces of the pressure-molded products were pressurized hydrostatically to 1,500 kg/cm$^2$·G using 30 wt. % aqueous boric acid held at 60° C. and in this state the space 7 was pressure-reduced to 1~10 mmHg abs. This condition was held for 5 hours to thereby effect dewaxing.

In the powder-molded products taken out from the pressure-resisting vessel there was found no such change in appearance as cracking or breakage of the thin film. In all of them, not less than 99% of each binder was vaporized and removed. The values of percent powder packing were all larger than those before dewaxing, as shown in Table 3.

Then, the powder-molded products were heated at 1,800° C. for 2 hours in just the same manner as in Example 8 to obtain sintered products having the densities described in Table 3.

Test pieces were cut out from the sintered products and measured for bending strength in just the same manner as in Example 8. Average values and standard deviations are as shown in Table 3.

TABLE 3

| Example | | 9 | 10 | 11 |
|---|---|---|---|---|
| Binder | Kind | Ethanol | Methanol | Water |
| | Part by weight | 25 | 25 | 35 |
| | Kind | Lauric Acid | Glycerin | CMC* |
| | Part by weight | 5 | 5 | 0.5 |
| Percent Powder Packing (before dewaxing) % | | 58 | 57 | 57 |
| Percent Powder Packing (after dewaxing) % | | 61 | 62 | 61 |
| Density of Sintered Product g/cm$^3$ | | 3.15 | 3.16 | 3.14 |
| Bending Strength | Average Value kg/mm$^2$ | 83 | 79 | 78 |
| | Standard Deviation kg/mm$^2$ | 3.4 | 3.0 | 3.5 |

*Carboxymethyl cellulose

EXAMPLES 12-14

The following experiment was conducted for the purpose of confirming the effect of hydrostatic pressures. As starting powders there were used silicon carbide powder having a specific surface area of 17 m$^2$/g and an average particle diameter of 0.25 $\mu$ as measured using an electron microscope image, elemental boron powder having a specific surface area of 10 m$^2$/g and an average particle diameter of 0.4 $\mu$, and carbon black having a specific surface area of 90 m$^2$/g and an average particle diameter of 0.03 $\mu$, in amounts of 100, 1 and 2 parts by weight, respectively. To the starting powders was added as a binder 35 parts by weight of water containing 0.5 wt. % of polyethylene glycol dissolved therein, followed by kneading. The mixture thus obtained was subjected to injection molding in just the same way as in Example 8. In this way there were obtained three powder-molded products each having a percent powder packing of 56%.

Those powder-molded products were each connected to the hollow pressure-resisting pipe 5 through the porous body 8 made of alumina in just the same manner as in Example 8. In this state a bisphenol A type epoxy resin was applied to the surfaces of the molded products, porous body and pipe and hardened to form a thin film having a thickness of 150 $\mu$.

Then, the thus-coated surfaces of the powder-molded products were pressurized hydrostatically at the pressures shown in Table 4 and in this state there was performed dewaxing by just the same pressure reducing and heating methods as in Example 8. The values of percent powder packing after the dewaxing are as shown in Table 4.

The powder-molded products were then heated at 2,050° C. for 1 hour in vacuum (not higher than 1 mmHg abs.) to obtain sintered products containing silicon carbide. The densities of the sintered products are as described in Table 4.

Then, test pieces were cut out from the sintered products and measured for bending strength in the same manner as in Example 8. Average values and standard deviations are as shown in Table 4.

TABLE 4

| Example | | 12 | 13 | 14 |
|---|---|---|---|---|
| Hydrostatic Pressure kg/cm$^2$ · G | | 10 | 500 | 2000 |
| Percent Powder Packing (after dewaxing) % | | 57 | 60 | 60 |
| Density of Sintered Product g/cm$^3$ | | 3.10 | 3.14 | 3.18 |
| Bending Strength | Average Value kg/mm$^2$ | 54 | 66 | 73 |
| | Standard Deviation kg/mm$^2$ | 7.1 | 5.4 | 3.8 |

What is claimed is:

1. A method of vaporizing and removing a binder from a powder-molded product containing a binder, which method comprises:
   coating all but 0.5% to 20% of the total surface area of said powder-molded product with an airtight thin resin film thereby leaving an exposed surface portion
   hydrostatically pressurizing the thus-coated surface portion of the pressure molded product;
   vaporizing the binder in the powder-molded product under said hydrostatic pressurization; and
   removing the vaporizing binder from the powder-molded product through said exposed surface portion not coated with the thin film.

2. A method as set forth in claim 1 wherein said vaporization of the binder of the powder-molded product occurs by heating the powder-molded product and removing said vaporized binder from the powder-molded product through said exposed surface portion.

3. A method as set forth in claim 1, wherein the powder-molded product is subjected to vacuum suction-deaeration through said exposed surface portion to vaporize and remove said binder from the powder-molded product through said exposed surface portion.

4. A method as set forth in claim 1, wherein the powder-molded product is heated and at the same time subjected to vacuum suction-deaeration through said exposed surface portion to vaporize and remove said binder from the powder-molded product through said exposed surface portion.

5. A method as set forth in claim 1, wherein the powder-molded product is formed by injection molding.

6. A method as set forth in claim 1, wherein the powder-molded product is formed by slip casting.

7. A method as set forth in claim 1, wherein the powder is a ceramic powder.

8. A method as set forth in any one of claims 1 to 7, wherein the powder-molded product after removal of the binder is subsequently ignited into a sintered ceramic product.

9. A method as set forth in claim 1 wherein said exposed surface portion of said powdered-molded product, uncovered with said thin resin film, represents 1% to 10% of the total surface area of said powder-molded product.

* * * * *